US009828730B2

(12) United States Patent
Melancon, Jr.

(10) Patent No.: US 9,828,730 B2
(45) Date of Patent: Nov. 28, 2017

(54) ROAD SIGN COVERING SYSTEM AND METHOD

(71) Applicant: Roger D. Melancon, Jr., Indianapolis, IN (US)

(72) Inventor: Roger D. Melancon, Jr., Indianapolis, IN (US)

( * ) Notice: Subject to any disclaimer, the term of this patent is extended or adjusted under 35 U.S.C. 154(b) by 126 days.

(21) Appl. No.: 14/684,560

(22) Filed: Apr. 13, 2015

(65) Prior Publication Data
US 2016/0297188 A1    Oct. 13, 2016

(51) Int. Cl.
| | |
|---|---|
| *B32B 37/22* | (2006.01) |
| *E01F 9/60* | (2016.01) |
| *B32B 27/32* | (2006.01) |
| *B32B 27/00* | (2006.01) |
| *B65H 35/00* | (2006.01) |

(52) U.S. Cl.
CPC ............... *E01F 9/60* (2016.02); *B32B 27/00* (2013.01); *B32B 27/32* (2013.01); *B65H 35/0026* (2013.01); *B32B 2323/046* (2013.01); *B32B 2323/10* (2013.01); *B32B 2327/06* (2013.01); *B32B 2355/00* (2013.01); *B32B 2367/00* (2013.01); *B32B 2590/00* (2013.01); *B32B 2597/00* (2013.01); *B65H 2301/51512* (2013.01); *B65H 2402/412* (2013.01); *B65H 2701/121* (2013.01); *B65H 2701/377* (2013.01)

(58) Field of Classification Search
CPC ....................................................... E01F 9/60
USPC ............................................................ 428/99
See application file for complete search history.

(56) References Cited

U.S. PATENT DOCUMENTS

| | | | | |
|---|---|---|---|---|
| 2005/0284487 | A1* | 12/2005 | Gellerstedt | ............ A61B 46/00 128/849 |
| 2007/0231571 | A1* | 10/2007 | Lane | ................... B29C 47/0021 428/354 |
| 2012/0027975 | A1* | 2/2012 | LaVelle | ................... B08B 17/00 428/40.1 |

* cited by examiner

*Primary Examiner* — Brent O'Hern
(74) *Attorney, Agent, or Firm* — Quarles & Brady LLP

(57) ABSTRACT

A system and method for obscuring road signs by applying an opaque adhesive-backed film to the signs from a roll containing the film. The film and adhesive may be able to conceal sign details sufficiently with only one or two layers of film. The film may be pressure-applied with an adhesive selected so as to adhere sufficiently to the signs or to other layers of film without leaving adhesive or other residue on the signs once removed. The film may be perforated at predetermined intervals to facilitate separation, and the system additionally or alternatively may include a cutter to permit the user to separate the film wherever desired. Various polymers may be used for the film, including polyvinyl chloride (PVC), polyvinylidene chloride (PVDC), polypropylene, low density polyethylene (LDPE), polyester, polyolefin, or other coextruded (CoEX) polymer films. Similarly, various adhesives, including latex-, acrylic-, rubber-, or silicone-based adhesives may be used.

16 Claims, 7 Drawing Sheets

ROAD SIGN COVERING SYSTEM AND METHOD

BACKGROUND

Various types of road signage are mounted alongside or above roadways in order to provide information to motorists. These signs include regulatory signs such as speed limit signs, stop or yield signs, one way signs, parking restriction signs, weight limitation signs, one-way signs, turn or lane use signs, etc. In addition, guide or other informational signs such as those posting current or approaching exits or junctions also may be posted to provide relevant information to drivers.

At times or in certain locations, such as in constructions zones, it may be necessary to modify the information presented by those signs. For example, speed limits may be reduced, traffic may be rerouted onto a shoulder or into an ordinarily oncoming traffic lane, or exit ramps may be closed temporarily. Thus, there is a need to present drivers with new or updated information, which often is achieved through use of a temporary sign. At the same time, there is a need to remove the existing information, in order to eliminate driver confusion, and to ensure that the driver is aware of current laws and is properly directed.

One possible way to remove the non-current information is to remove the signs containing that information. This method is not preferred since it can require substantial effort to remove all affected signage. Additionally, many if not all of the signs that would be removed ultimately are reinstalled, and substantial time, effort, and cost would be expended in replacing the signs and in sorting and storing those signs for the duration of a construction project.

Other methods of removing the non-current information involve attempting to conceal the sign from view while keeping it in place. Examples of this method include placing another object such as another sign or a wood board over the original sign, usually followed by securing the object to the original sign. While effective at concealing the sign, these methods have been known to generate friction that can scratch the original sign or wear away the information displayed on the original sign.

Alternatively, the original sign may be covered with some type of covering such as a bag or tarp that then is secured into place using a tie-down device or an adhesive such as duct tape. This method may be effective initially, but over time, the covering has been known to form holes and to separate from the sign. Additionally, even if not applied directly to the sign initially, the adhesive has been known to adhere to the sign when the cover separates, leaving an undesirable residue on the sign that is difficult to remove, and that attracts and retains dirt or other particles, thereby potentially obscuring a portion of the sign until it ultimately is removed or replaced.

In still another alternative, instead of an adhesive, one or more fasteners may be disposed through the covering and the sign in order to hold the covering in place. This may result in firmer securement, but that occurs at the expense of having to put holes in the sign, thereby damaging the sign.

Thus, while these methods may be effective at concealing the desired signage, concealment may come with increased cost or at the expense of damaging the underlying sign.

SUMMARY

In one aspect, a road sign obscuring system includes a roll of film having an interior side and an exterior side, an adhesive applied to at least one of the interior side and the exterior side, and a tubular support member radially inward of the roll of film. The film and adhesive have opacity large enough that two layers of film—and alternatively a single layer—obscure details of a road sign. Additionally, the adhesive is selected to avoid leaving a residue on the road sign.

In another aspect, a method for obscuring a road sign includes the steps of: locating an edge of a film, the film wound in a roll about a support member, separating the edge from the roll and unrolling a portion of the film, adhering an adhesive-having surface of the film to the road sign, continuing to unroll the film and to adhere the film to the road sign, and separating the film adhered to the road sign from film remaining on the roll. The adhesive may have an adhesion of at least about 3 N/25 mm, and the film and adhesive may have a combined thickness of at least about 0.2 mm.

In still another aspect, the road sign obscuring system includes sheets of film having an interior side and an exterior side, and an adhesive applied to at least one of the interior side and the exterior side. The sheets may be stacked one upon another for compact storage and transportation. The film and adhesive have opacity large enough that two layers of film—and alternatively a single layer—obscure details of a road sign. Additionally, the adhesive is selected to avoid leaving a residue on the road sign. Applying the film may include the steps of peeling a first sheet of film from a stack, removing a backing layer if present, applying the sheet to at least the information-containing face of the sign, and repeating the process with additional sheets if necessary until the information is sufficiently obscured such that it no longer is visible to an ordinary observer.

DESCRIPTION OF THE DRAWINGS

The foregoing and other features and advantages of the present invention will become apparent to those skilled in the art to which the present invention relates upon reading the following description with reference to the accompanying drawings, in which.

DETAILED DESCRIPTION

Figure 1:
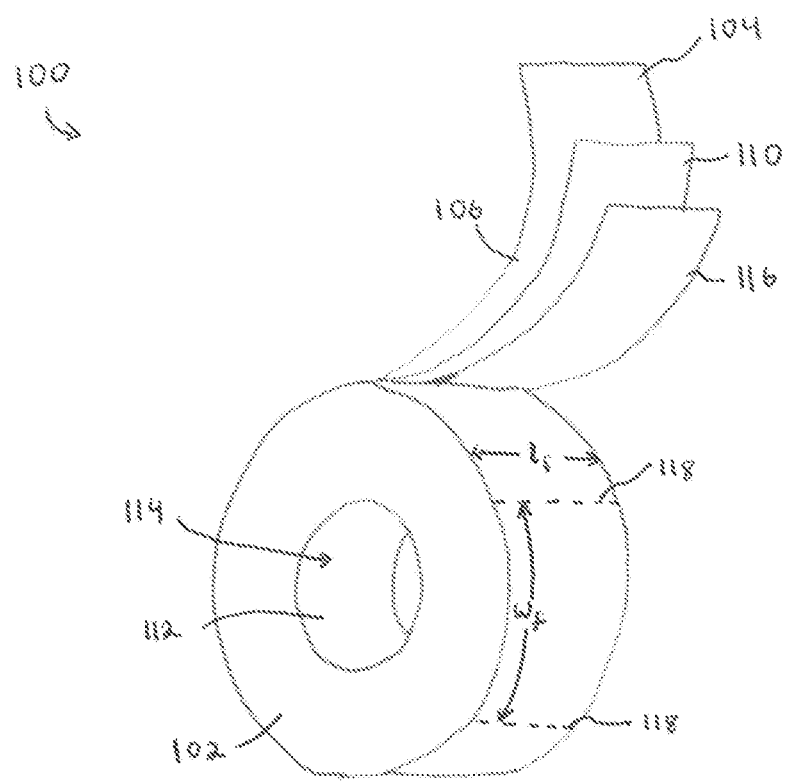
FIG. 1 is an isometric view of a first embodiment of a system for applying a film to a road sign, with an adhesive disposed on a radially inner side of each film layer.

Before any embodiments are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

With reference to FIG. 1, one embodiment of a system 100 for temporarily concealing a road sign is depicted. The system 100 includes a roll 102 of film 104 having a first, interior side 106 and a second, exterior side 108 (see FIG. 3). In this embodiment, the interior side 106 of the film 104 is at least partially coated with an adhesive 110 that has sufficient adhesion to secure the film 104 to a street sign and/or to a successive layer of film 104. In this figure and in the figures that follow depicting other embodiments, the adhesive is shown as a separate layer. Alternatively, the adhesive may be applied directly to at least a portion of film.

The roll 102 also may include a tubular support member 112 interior of all of the film 104 and the adhesive 110 and defining a central opening 114 of the roll 102. The tubular support member 112 may be made of a sturdy material that resists deformation while the film 104 is being applied. In one example, the tubular support member 112 may be a paperboard or cardboard material, although other material choices are permissible.

Figure 2:
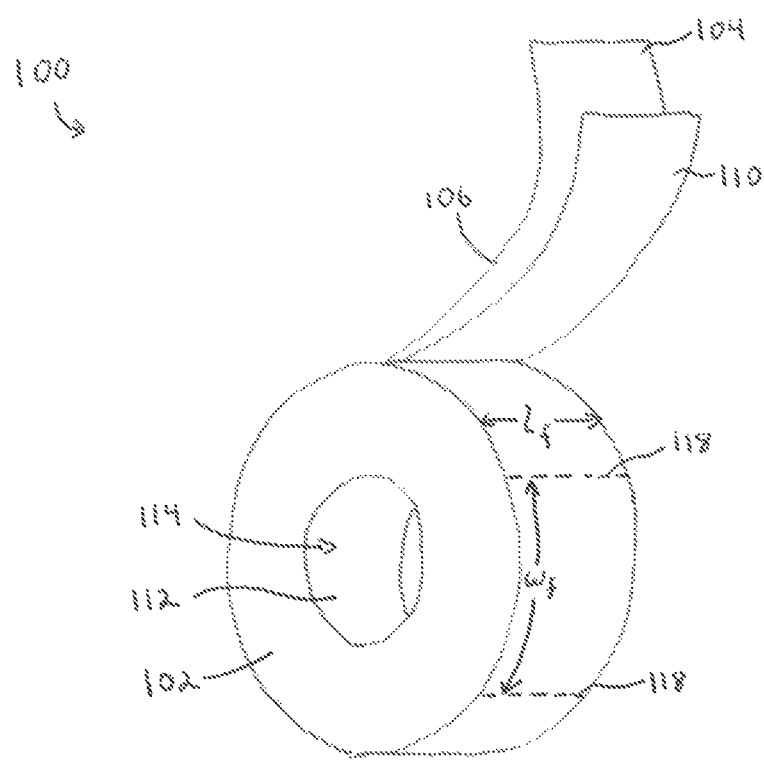
FIG. 2 is a variation of the embodiment of FIG. 1, without a release liner between successive layers of film.

In one aspect, the roll 102 also may optionally include a release liner 116, e.g., a paper backing, between the adhesive 110 and a successive layer of film 104 in order to assist in separating successive film layers. In another aspect, as seen in FIG. 2, the roll does not include a release liner 116, such that the adhesive 110 releasably contacts a radially inward, successive layer of film 104 directly.

A roll 102 of film 104 may have a length, $l_f$, measured along an axis of rotation of the roll 102, and multiple rolls of film 104 may have different lengths in order to permit a user to select a desired roll 102 based on the sign being covered. For example, the user may select a roll of film having a first length for covering smaller signs like speed limit signs and parking restriction signs and a second, larger, roll of film having a second length for covering larger signs like guide or exit signs. Exemplary lengths may include about 1 ft., about 2 ft., about 3 ft., about 4 ft., and about 5 ft. Other heights or ranges of heights also are possible.

The film 104 also may be separable into predetermined widths, $w_f$, such as through the inclusion of scoring lines or perforations 118 at constant intervals along the width of the film 104 as the film 104 is unrolled. Spacing of the perforations 118 may depend on the type of sign to be covered and/or upon the height of the film selected by the user. Exemplary perforation spacings may include about 1 ft., about 1.5 ft., about 2 ft., about 3 ft., and about 4 ft. Other perforation spacings also are possible, and narrower perforation spacings are not required to coincide with smaller roll heights. For example, a 1 ft. high roll may have perforations every 1.5 ft., 2 ft., 3 ft., or 4 ft. and not necessarily every 1 ft.

Figure 3:
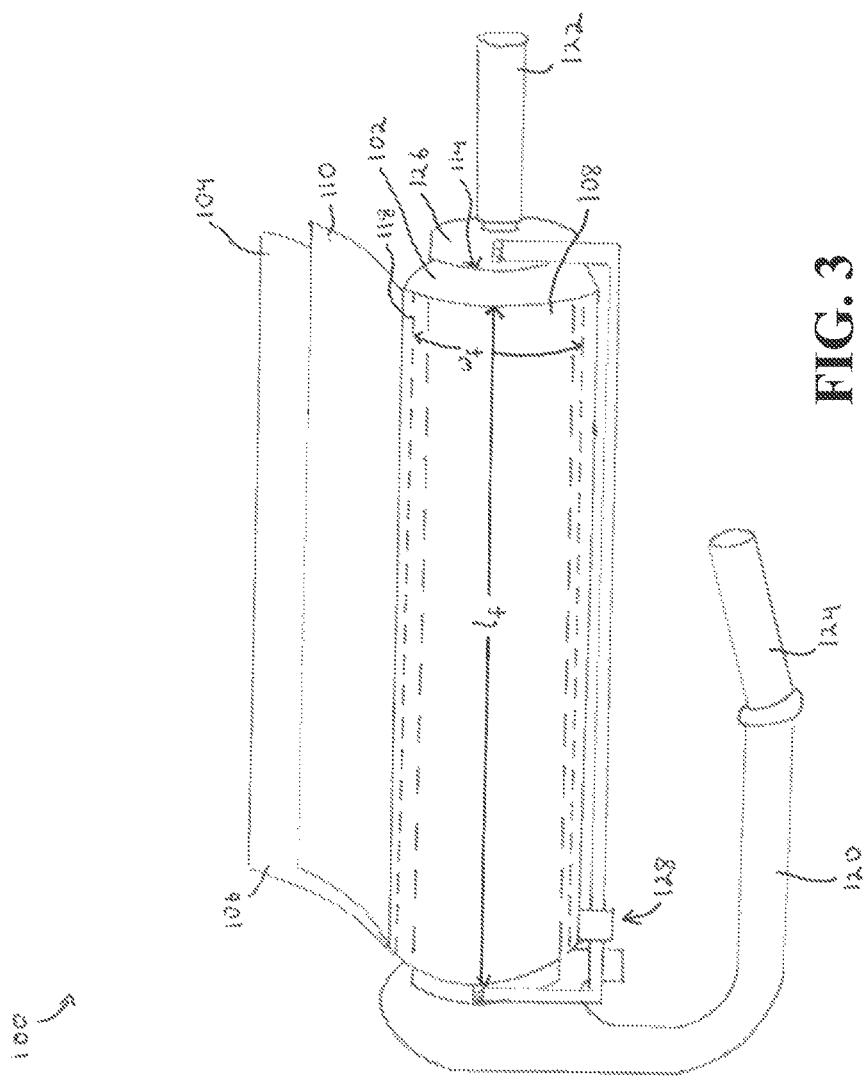
FIG. 3 is a variation of the system of FIG. 2, further including an applicator to assist with the dispensing of film.

Turning to FIG. 3, the system 100 additionally may include an applicator 120 to assist in unwinding the film 104 and applying to a road sign. The applicator 120 may include a handle 122 extending beyond a height of the roll 102 and an insert 126 extending into the central opening 114 to secure the handle 122 to the roll 102. The handle 122 may be cylindrical in cross-section, although other cross-sectional shapes are possible. Additionally, one or more supplemental gripping portions 124 may extend perpendicularly from, parallel to, or at an angle to the handle 122 in order to provide an additional hand grip and to give the user greater leverage in maneuvering the system 100.

The handle 122 may be sized to have a cross-section that fits comfortably within the hand of a typical adult human. In the case where the handle 122 is cylindrical, the handle 122 may have a diameter between about 1 in. and about 3 in., and in one aspect, about 2 in.

The handle 122 also may have a length, $l_h$, extending from one end of a handle to an end of the roll 102 opposite the handle, where the length is sized to balance the top-heavy or off-center weight distribution of the system 100 due to the weight of a full roll 102 of film 104 against desires to minimize an overall weight of the system 100 and to prevent the system 100 from becoming unwieldy.

In one aspect, the handle 122, insert 126, and tubular support member 112 may be fixed relative to one another, such that the handle rotates as the film 104 is applied. In another aspect, the handle 122 may be journaled to the insert 126, permitting the insert 126 and tubular support member 112 to rotate relative to the handle 122. Thus, during application, the user may be able to hold the handle in a constant position and apply the film 104 to the desired road sign.

In addition to, or instead of the perforations 118, the system 100 may include a cutter 128 configured to cut the film 104 at a desired location. One example of a cutter 128 may be a blade attached to a cord or other flexible member at a first end of the member, where the second end of the member is attached to the applicator 120, e.g., proximate a lower end of the roll 102. Another example of a cutter 128 may be a blade that is attached to a guide running along the length of the roll 102, parallel to the axis of rotation. The guide may be hinged at one or both of its top and bottom ends such that it is configured to keep the blade disposed a predetermined distance away from the film 104, even as the roll 102 gets smaller as more film is dispensed.

The film 104 is made of a flexible material that deforms freely and adheres to the street sign. Additionally, the material chosen for the film 104 may have natural adhesive characteristics in order to enhance the effectiveness of the adhesive 110. Exemplary materials for the film 104 include polyvinyl chloride (PVC), polyvinylidene chloride (PVDC), polypropylene, low density polyethylene (LDPE), polyester, polyolefin, other coextruded (CoEX) polymer film, and/or combinations thereof.

The adhesive 110 may have an adhesion that is selected by balancing improved gripping against a desire to minimize or eliminate adhesive transfer to the sign being covered. The adhesive also should be selected so as to keep the film 104 in place for a minimum period of time, e.g., at least about six months, despite exposure to wide air temperature variations, e.g., between about −20° F. and about 120° F., as well as exposure to wind, rain, UV radiation, and other meteorological conditions, although the film 104 should be removable before that period of time has elapsed, if so desired. Adhesives may be water-based or solvent-based, e.g., latex-, acrylic-, rubber-, or silicone-based. Other adhesives alternatively may be used. Moreover, different adhesives may be selected depending on the climate, e.g., average temperature or humidity, for the time period in which the film 104 is to be used. The adhesive 110 used in the system 100 may have an adhesion of between about 1 N/25 mm and about 20 N/25 mm in one aspect, between about 2 N/25 mm and about 10 N/25 mm in another aspect, and between about 3 N/25 mm and about 7 N/25 mm in still another aspect. Alternatively, the adhesive 110 may have an adhesion of at least about 3 N/25 mm.

One or more of the film 104 and the adhesive layer 110 may have an opacity selected so that a double layer of film and, more preferably, a single layer of film, is sufficient to obscure the information displayed on the sign from view. This may be accomplished by tinting one or more of the layers. The film 104 also may be provided with a matte finish or an anti-glare coating on the surface that is exposed when the film is applied to a sign.

Additionally, the combination of film 104 and adhesive 110 should have sufficient tensile strength to avoid inadvertent cutting, e.g., due to exposure to the elements or frictional rubbing or stress concentrations at the edges of the signs being covered. In one aspect, the combination may have a tensile strength of between about 25 N/25 mm and about 400 N/25 mm in one aspect, between about 50 N/25 mm and about 300 N/25 mm in another aspect, and between about 75 N/25 mm and about 200 N/25 mm in still another aspect. Alternatively, the adhesive may have a tensile strength of at least about 100 N/25 mm. The combination also may have an elongation of between about 100% and about 1000% in one aspect, at least about 200% in another aspect, and at least about 500% in yet another aspect.

In another aspect, the desired opacity and durability may be achieved by increasing a thickness of one or more of the layers. A combination of the film 104 and adhesive 110 may have a thickness of between about 0.1 mm and about 0.7 mm in one aspect, between about 0.1 mm and about 0.5 mm in another aspect, and between about 0.1 mm and about 0.4 mm in still another aspect. Additionally or alternatively, the film 104 and adhesive 110 may have a combined thickness of at least about 0.12 mm in one aspect, and at least about 0.2 mm in another aspect.

In a specific example, the system 100 may include a pressure sensitive UV stabilized polyolefin film 104 with a solvent rubber adhesive 110 having a combined thickness of about 0.1 mm, and an adhesion of about 3.9 N/25 mm. The combination of the film 104 and adhesive 110 may have a tensile strength of at least about 110 N/25 mm and an elongation of about 740%.

Figure 4:
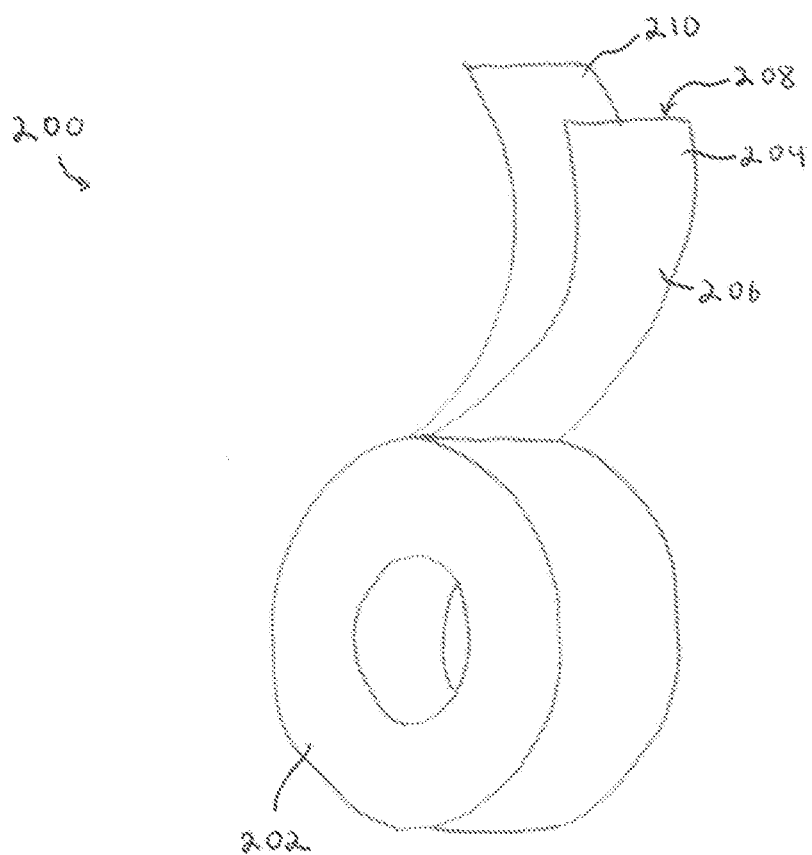
FIG. 4 is an isometric view of a second embodiment of a system for applying a film to a road sign, with an adhesive disposed on a radially outer side of each film layer.

FIG. 4 depicts another embodiment of the system 200 similar to the first embodiment 100 shown in the variation of FIG. 2. In this embodiment, the system 200 includes a roll 202 of film 204 having a first, interior side 206 and a second, exterior side 208, where the exterior side 208 of the film 204 is at least partially coated with an adhesive 210. Applying the film 204 in this embodiment may include separating a free end of the film 204 from a remainder of the roll 202, contacting the adhesive-coated exterior side 208 with the surface of the sign to be concealed proximate an edge of the sign, unrolling an amount sufficient to cover the displayed information on the sign and adhering that amount to the sign, and then separating the adhered film 204 from the remainder of the roll 202. In this and the other embodiments described herein, the film 204 to be used can be separated and/or detached from the remainder of the roll 202 prior to adhering any of it to the sign surface.

Figure 5:
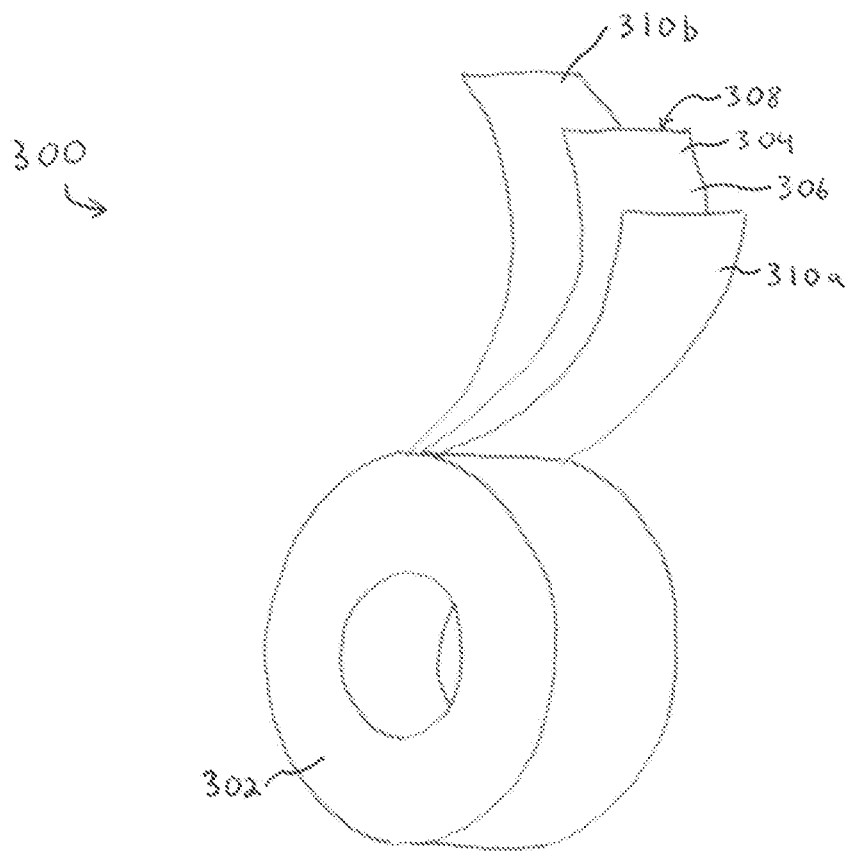
FIG. 5 is an isometric view of a third embodiment of a system for applying a film to a road sign, with an adhesive disposed on both sides of each film layer.

FIG. 5 depicts a third embodiment of the system 300 similar to the first and second embodiments 100, 200. In this embodiment, the system 300 includes a roll 302 of film 304 having a first, interior side 306 and a second, exterior side 308, where both the interior side 306 and the exterior side 308 of the film 304 is at least partially coated with an adhesive 310a, 310b, respectively. The adhesive 310a at least partially coating the interior side 306 may be the same as the adhesive 310b at least partially coating the exterior side 308, although different adhesives 310a, 310b may be used. For example, the adhesive 310a on the interior side 306 may have a greater adhesion than the adhesive 310b on the exterior side 308. Additionally, the adhesives 310a, 310b may be the same as adhesives 110, 210, or a different adhesive, e.g., one with a lower adhesion, may be used. In this latter case, each adhesive 310a, 310b may have an adhesion at least half that of adhesives 110, 210.

Like the FIG. 2 variation, FIGS. 4 and 5 do not include a release liner, although it is possible for the systems 200, 300 to have one, as with the FIG. 1 variation of the first embodiment.

Figure 6:
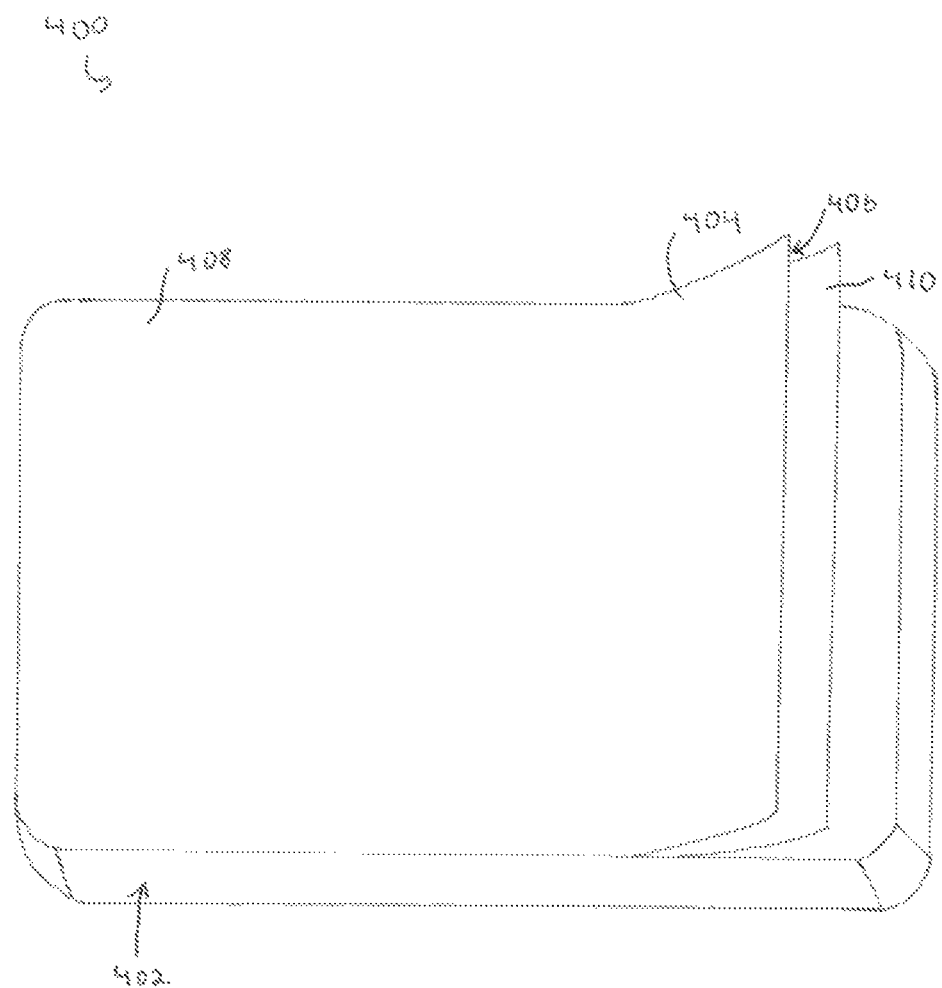
FIG. 6 is an isometric view of a fourth embodiment of a system for applying a film to a road sign.

FIG. 6 depicts yet another embodiment of the system 400 in which sheets 402 of film 404 may be used instead of a roll. Each sheet 402 may include an interior side 406, an exterior side 408, and an adhesive 410 applied to at least one of the interior side 406 and the exterior side 408. The sheets 402 may be stacked one upon another for compact storage and transportation, and stacks of sheets may come in various sizes, e.g., for use with signs of different dimensions. One or both of the film 404 and adhesive 410 may have an opacity large enough that two layers of film 404—and alternatively a single layer—obscure details of a road sign. Additionally, as with the embodiments in which film is disposed on rolls, the adhesive 410 in this embodiment may be selected to avoid leaving a residue on the road sign. Applying the film 404 may include the steps of peeling a first sheet of film from a stack, removing a backing layer if present, applying the sheet to at least the information-containing face of the sign, and repeating the process with additional sheets if necessary until the information is sufficiently obscured such that it no longer is visible to an ordinary observer.

A method of covering a road sign may involve first selecting a roll 102 that is adequate for the sign to be covered, which may include making a selection based on a length of the roll and/or characteristics of the adhesive. The selected roll 102 may be installed on an applicator 120 by sliding the roll 102 over an end of the applicator 120 until it reaches a stop or other structure signifying a stopping position. Alternatively, the selected roll 102 already may be installed on the applicator 120 or may be used without an applicator.

Figure 7A:
FIG. 7a is a front view of a road sign prior to concealment.
Figure 7B:
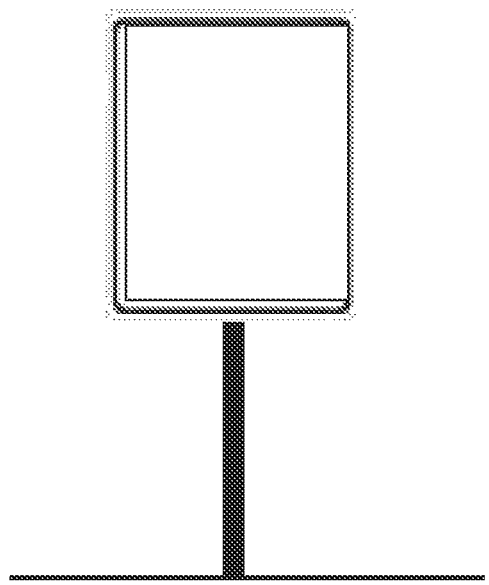
FIG. 7b is a front view of the road sign of FIG. 7a after concealment.

The user then may locate a leading edge 130 of the roll 102 disposed at some location about the periphery of the roll 102 and peel a portion of the film 104 away from a remainder of the roll 102. If the system includes a release liner 116, a portion of that liner 116 may be separated from the film 104 in order to expose the adhesive 110. The user then may depress the adhesive surface against the sign to be covered. In the embodiments of FIGS. 1 and 2, this involves depressing the interior side 106 against the sign. In the embodiment of FIG. 4, this involves depressing the exterior side 208 against the sign. In the embodiment of FIG. 5, this involves depressing either the interior side 306 or the exterior side 308 against the sign. FIGS. 7a and 7b depict one example of a road sign prior to and after concealment with the film 104.

In one aspect, backing is removed if present, and the film 104 is applied to at least a portion of the front face of the sign, in order to conceal the information presented thereon. Alternatively, the film 104 may continue around one or more sides of the sign, so as to contact a rear face of the sign or, depending on how much film is unrolled, to contact other portions of film upon being wrapped around the sign. At least one layer of film concealing the information on the front sign face is preferred, and multiple layers may be applied, e.g., to increase the total opacity of the portions of film 104 covering the sign or in the event a portion of the film 104 inadvertently tears and needs to be covered with additional film 104.

In the event the applicator 120 is used, the user may hold the handle 122 in at least one hand while guiding the film along the surface of the sign. Additionally or alternatively, the user also may hold the supplemental handle 124, which may be located near an intersection of the handle 122 and the roll 102, to provide additional leverage or more control in applying the film 104.

Once a desired amount of film 104 has been applied to the sign, the user may separate the applied film 104 from the remainder of the roll 102. Separation may occur at a predefined perforation or at a location determined by the user by employing the cutter.

If additional signs need to be covered, or if the roll 102 selected by the user does not cover the sign sufficiently, the process may be repeated until all relevant sign portions are obscured. The latter instance may occur if the roll is smaller than the sign to be covered or if not enough film was applied to obscure details of the sign sufficiently, i.e., to a point where the information displayed on the sign cannot be seen through the film and adhesive or is so faint as to effectively be obscured completely, such that the average motorist would reasonably know to disregard the sign.

It should be evident that this disclosure is by way of example and that various changes may be made by adding, modifying or eliminating details without departing from the scope of the teaching contained in this disclosure. As such, it is to be appreciated that the person of ordinary skill in the art will perceive changes, modifications, and improvements to the example disclosed herein. Such changes, modifications, and improvements are intended to be within the scope of the present invention.

It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein. Various features and advantages of the invention are set forth in the following claims.

The invention claimed is:

1. A road sign obscuring system, comprising:
a metallic road sign; and
a road sign obscuring device configured for use on the metallic road sign, comprising:
a roll of an opaque film having an interior side and an exterior side;
an adhesive applied to the interior side; and
a tubular support member radially inward of the roll of the opaque film,
wherein the adhesive is selected to have an adhesion with respect to the metallic road sign of between 1 N/25 mm to 20 N/25 mm upon initial application of the adhesive to the metallic road sign.

2. The system of claim 1, wherein the opaque film completely obscures the metallic road sign.

3. The system of claim 1, wherein the adhesive is a rubber-based adhesive.

4. The system of claim 1, further comprising an applicator coupled to the roll.

5. The system of claim 4, wherein the applicator includes a handle configured to extend away from the roll.

6. The system of claim 5, wherein the handle is configured to rotate relative to the tubular support member.

7. The system of claim 1, further comprising a cutter.

8. The system of claim 1, wherein the opaque film is perforated at predetermined intervals.

9. The system of claim 1, wherein the adhesion of the adhesive is at least about 3 N/25 mm and the opaque film and the adhesive have a combined thickness of at least about 0.2 mm.

10. The system of claim 1, wherein the opaque film is selected from the group consisting of polyvinyl chloride (PVC), polyvinylidene chloride (PVDC), polypropylene, low density polyethylene (LDPE), polyester, polyolefin, or other coextruded (CoEX) polymer film.

11. The system of claim 1, wherein a combination of the opaque film and the adhesive has a tensile strength between about 25 N/25 mm and about 400 N/25 mm.

12. The system of claim 1, wherein a combination of the opaque film and the adhesive has an elongation of between about 100% to about 1000%.

13. The system of claim 1, wherein the opaque film has a length of about 1 ft. to about 5 ft.

14. The system of claim 10, wherein the opaque film is a polyolefin.

15. The system of claim 1, wherein the opaque film has at least one of a matte finish or an anti-glare coating thereon.

16. A road sign obscuring system for use on a metallic road sign, the road sign obscuring system comprising:
the metallic road sign;
at least one sheet of film having an interior side and an exterior side; and
an adhesive applied to the interior side,
wherein the adhesive is selected to have an adhesion of between 1 N/25 mm to 20 N/25 mm when initially applied to the metallic road sign.

* * * * *